(12) United States Patent
Liu

(10) Patent No.: US 11,382,009 B2
(45) Date of Patent: Jul. 5, 2022

(54) SYNCHRONIZATION BLOCK RECEIVING METHOD AND APPARATUS, AND SYSTEM INFORMATION TRANSMISSION METHOD AND APPARATUS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 86 days.

(21) Appl. No.: 16/629,775

(22) PCT Filed: Jul. 24, 2017

(86) PCT No.: PCT/CN2017/094051
§ 371 (c)(1),
(2) Date: Jan. 9, 2020

(87) PCT Pub. No.: WO2019/018978
PCT Pub. Date: Jan. 31, 2019

(65) Prior Publication Data
US 2021/0112464 A1 Apr. 15, 2021

(51) Int. Cl.
*H04W 36/00* (2009.01)
*H04W 56/00* (2009.01)

(52) U.S. Cl.
CPC ..... *H04W 36/0055* (2013.01); *H04W 56/001* (2013.01)

(58) Field of Classification Search
None
See application file for complete search history.

(56) References Cited

U.S. PATENT DOCUMENTS

| 2012/0122453 A1 | 5/2012 | Shin et al. |
| 2012/0184278 A1 | 7/2012 | Chin et al. |
| 2018/0352461 A1* | 12/2018 | Guirguis ............... H04B 17/336 |
| 2021/0144596 A1* | 5/2021 | Yang ..................... H04W 52/02 |

FOREIGN PATENT DOCUMENTS

| CN | 104507157 A | 4/2015 |
| EP | 2 605 443 A2 | 7/2007 |
| WO | WO 2014/176781 A1 | 11/2014 |

(Continued)

OTHER PUBLICATIONS

Extended European Search Report in European Application No. 17919195.2, dated Feb. 22, 2021.

(Continued)

*Primary Examiner* — Saad Khawar
(74) *Attorney, Agent, or Firm* — Finnegan, Henderson, Farabow, Garrett & Dunner, L.L.P.

(57) ABSTRACT

A synchronization block receiving method includes: receiving system information of a first cell, wherein the system information includes indication information; determining, according to the indication information, whether the first cell and a second cell adjacent to the first cell belong to a synchronization system; and when the first cell and the second cell belong to the synchronization system, receiving a synchronization block of the second cell according to a time when a synchronization block of the first cell is received.

12 Claims, 10 Drawing Sheets

(56) References Cited

FOREIGN PATENT DOCUMENTS

| | | |
|---|---|---|
| WO | WO 2016/182288 A1 | 11/2016 |
| WO | WO 2016/204573 A1 | 12/2016 |
| WO | WO 2018/231893 A1 | 12/2018 |

OTHER PUBLICATIONS

Office Action of Indian Application No. 202027002312, dated Mar. 10, 2021.
English version of International Search Report in PCT Application No. PCT/CN2017/094051 dated Dec. 21, 2017.
NTT Docomo, Inc., Discussion and evaluation on NR RRM measurement based on SS block, 3GPP TSG RAN WG1 Meeting #89, R1-1708444, Hangzhou, P.R. China, May 15-19, 2017, 8 pages.
RAN WG1, Reply LS response on reading time index indication for RRM measurements, 3GPP TSG RAN WG1 Meeting NR Ad-hoc#2, R1-1711966, Qingdao, P.R. China, Jun. 27-30, 2017, 2 pages.

* cited by examiner

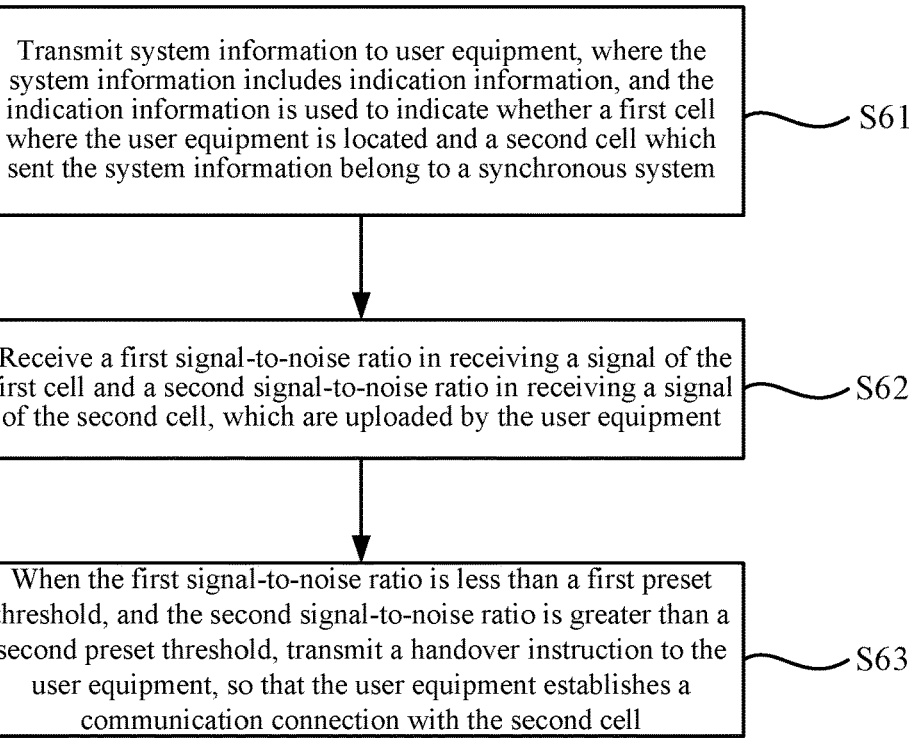
Fig. 7
Fig. 8
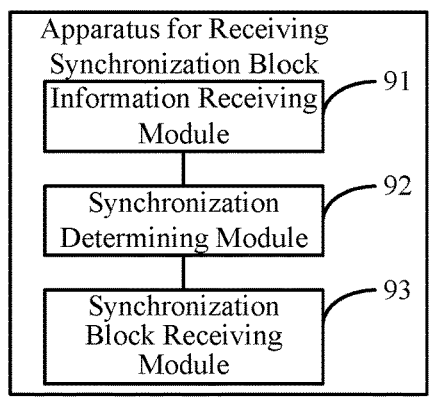
Fig. 9

SYNCHRONIZATION BLOCK RECEIVING METHOD AND APPARATUS, AND SYSTEM INFORMATION TRANSMISSION METHOD AND APPARATUS

CROSS REFERENCE TO RELATED APPLICATIONS

This application is a national phase application based on PCT/CN2017/094051, filed Jul. 24, 2017, the entire content of which is incorporated herein by reference.

TECHNICAL FIELD

The present disclosure relates to the field of communication technologies, and more particularly, to a method for receiving a synchronization block, an apparatus for receiving a synchronization block, a method for transmitting system information, an apparatus for transmitting system information, an electronic device, and a computer readable storage medium.

BACKGROUND

At present, in a standardization process of 5G (Fifth Generation Mobile Communication Technology) of the 3GPP (3rd Generation Partnership Project), a synchronization block is mainly transmitted by means of beam scanning, and a synchronization signal and a physical broadcast channel are carried by the synchronization block.

User equipment needs to perform synchronized-block-based measurement according to the configuration of the system. In addition to measuring the synchronization signal in the synchronization block of the own cell, it is also necessary to measure a synchronization signal in a synchronization block of another cell. In order to measure the synchronization signal in the synchronization block of another cell, it is necessary to determine the time information of receiving the synchronization block of another cell.

SUMMARY

According to a first aspect of the embodiments of the present disclosure, there is provided a method for receiving a synchronization block, including:

receiving system information of a first cell, where the system information includes indication information;

determining, according to the indication information, whether the first cell and N second cells adjacent to the first cell belong to a synchronous system, where N is an integer greater than or equal to 1; and when the first cell and the N second cells belong to the synchronous system, receiving a synchronization block of the N second cells according to a time for receiving a synchronization block of the first cell.

According to a second aspect of the embodiments of the present disclosure, there is provided a method for transmitting system information, including:

transmitting system information to user equipment, where the system information includes indication information, and the indication information is used to indicate whether a first cell where the user equipment is located and a second cell which sent the system information belong to a synchronous system.

According to a third aspect of the embodiments of the present disclosure, there is provided an apparatus for receiving a synchronization block, including:

an information receiving module configured to receive system information of a first cell, where the system information includes indication information;

a synchronization determining module configured to determine, according to the indication information, whether the first cell and N second cells adjacent to the first cell belong to a synchronous system, where N is an integer greater than or equal to 1; and a synchronization block receiving module configured to, when the first cell and the N second cells belong to the synchronous system, receive a synchronization block of the N second cells according to a time for receiving a synchronization block of the first cell.

According to a fourth aspect of the embodiments of the present disclosure, there is provided an apparatus for transmitting system information, including:

an information transmission module configured to transmit system information to user equipment, where the system information includes indication information, and the indication information is used to indicate whether a first cell where the user equipment is located and a second cell which sent the system information belong to a synchronous system.

According to a fifth aspect of the embodiments of the present disclosure, there is provided an electronic device, including:

a processor;

a memory for storing instructions executable by the processor;

wherein the processor is configured to:

receive system information of a first cell, where the system information includes indication information;

determine, according to the indication information, whether the first cell and N second cells adjacent to the first cell belong to a synchronous system, where N is an integer greater than or equal to 1; and when the first cell and the N second cells belong to the synchronous system, receive a synchronization block of the N second cells according to a time for receiving a synchronization block of the first cell.

According to a sixth aspect of the embodiments of the present disclosure, there is provided an electronic device, including:

a processor;

a memory for storing instructions executable by the processor;

wherein the processor is configured to:

transmit system information to user equipment, where the system information includes indication information, and the indication information is used to indicate whether a first cell where the user equipment is located and a second cell which sent the system information belong to a synchronous system.

According to a seventh aspect of the embodiments of the present disclosure, there is provided a computer readable storage medium having stored thereon a computer program, wherein the program, when executed by a processor, implements steps of:

receiving system information of a first cell, where the system information includes indication information;

determining, according to the indication information, whether the first cell and N second cells adjacent to the first cell belong to a synchronous system, where N is an integer greater than or equal to 1; and when the first cell and the N second cells belong to the synchronous system, receiving a synchronization block of the N second cells according to a time for receiving a synchronization block of the first cell.

According to an eighth aspect of the embodiments of the present disclosure, there is provided a computer readable storage medium having stored thereon a computer program, wherein the program, when executed by a processor, implements a step of:

transmitting system information to user equipment, where the system information includes indication information, and the indication information is used to indicate whether a first cell where the user equipment is located and a second cell which sent the system information, belong to a synchronous system.

The technical solutions provided by the embodiments of the present disclosure may include the following beneficial effects.

It can be seen from the above embodiments that, when it is determined that the first cell and the N second cells belong to the synchronous system, since the user is currently in the first cell, it is possible to determine the time for receiving the synchronization block of the first cell. Then, when the time for receiving the synchronization block sent by the first cell and the time for receiving the synchronization block sent by the second cell are in the same time period in one cycle, the synchronization block of the second cell can be received at the time for receiving the synchronization block of the first cell. When there is a specific time difference between the time for receiving the synchronization block sent by the first cell and the time for receiving the synchronization block sent by the second cell, the synchronization block of the second cell can be received at a time delayed or advanced a specific time from the time for receiving the synchronization block of the first cell.

In the process of receiving the synchronization block of the second cell in the embodiments of the present disclosure, it is not necessary to parse the system information of the second cell, so that the time for receiving the synchronization block of the second cell can be determined more quickly, thereby receiving the synchronization block more quickly. In turn, the synchronization information in the synchronization block can be acquired more quickly, so that the user equipment can quickly complete the handover of the cell.

It should be understood that both the above general description and the following detailed description are exemplary and explanatory only and are not restrictive of the disclosure.

BRIEF DESCRIPTION OF THE DRAWINGS

In order to more clearly illustrate the technical solutions in the embodiments of the present application, the drawings used in the description of the embodiments will be briefly described below. Apparently, the drawings in the following description are only some embodiments of the present application. From these drawings, other drawings may be obtained by those skilled in the art without any creative effort.

FIG. 7 is a schematic flowchart of a method for transmitting system information according to an exemplary embodiment.

FIG. 8 is a schematic flowchart of another method for transmitting system information according to an exemplary embodiment.

FIG. 9 is a schematic block diagram of an apparatus for receiving a synchronization block according to an exemplary embodiment.

DETAILED DESCRIPTION

The technical solutions in the embodiments of the present application are clearly and completely described in the following with reference to the accompanying drawings in the embodiments of the present application. Apparently, the described embodiments are only a part of the embodiments of the present application, and not all of the embodiments. All other embodiments obtained by a person of ordinary skill in the art based on the embodiments of the present application without paying creative effort should fall within the protection scope of the present application.

Figure 1:
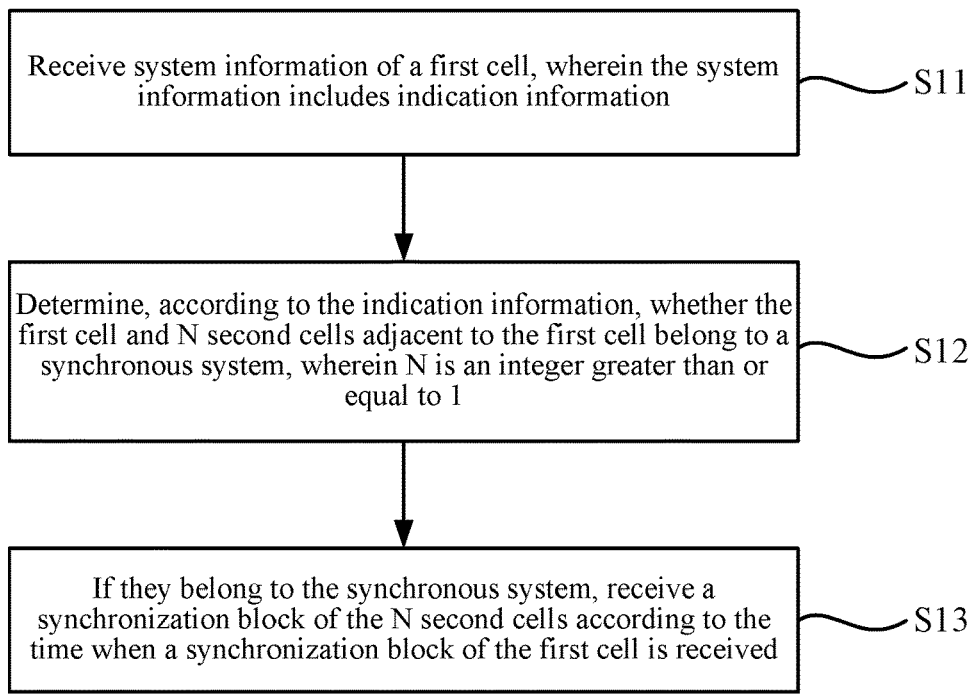
FIG. 1 is a schematic flowchart of a method for receiving a synchronization block according to an exemplary embodiment.

FIG. 1 is a schematic flowchart of a method for receiving a synchronization block according to an exemplary embodiment. The method shown in this embodiment may be applicable to user equipment, and the user equipment may be a terminal such as a mobile phone or a tablet computer. As shown in FIG. 1, the method for receiving a synchronization block includes the following steps.

In step S11, system information of a first cell is received, where the system information includes indication information.

In an embodiment, there are a Master Information Block (MIB) and a System Information Block (SIB) in the system information, and the indication information may be included in the SIB or may be included in the MIB.

In step S12, it is determined, according to the indication information, whether the first cell and N second cells adjacent to the first cell belong to a synchronous system, where N is an integer greater than or equal to 1.

In an embodiment, the first cell and the second cell may correspond to the same 5G base station, or may correspond to different 5G base stations.

In an embodiment, there may be two relationships between the first cell and the second cell, that is, both belong to a synchronous system, or both belong to an asynchronous system. If the first cell and the second cell belong to the synchronous system, the time when the first cell sends a synchronization block and the time when the second cell sends a synchronization block are synchronized to some extent. If the first cell and the second cell belong to the asynchronous system, the time when the first cell sends a synchronization block and the time when the second cell sends a synchronization block are completely out of synchronization.

In step S13, if they belong to the synchronous system, a synchronization block of the N second cells is received according to a time for receiving a synchronization block of the first cell.

In an embodiment, the synchronization block may carry a Physical Broadcast Channel (PBCH), a Subsidiary Synchronization Signal (SSS), and a Demodulation Reference Signal (DMRS), and may also carry a Primary Synchronization Signal (PSS).

In the related art, in order to receive the synchronization block of the second cell, it is necessary to parse the system information of the second cell to determine the time for receiving the synchronization block of the second cell. Analyzing the system information of the second cell requires additional time consumption. This may cause difficulty for the user equipment to be handed over to a suitable cell in some scenarios. For example, during high-speed movement of the user, the user equipment may rapidly measure the synchronization signals in the synchronization blocks of a plurality of second cells, every time the user equipment measures a synchronization signal in a synchronization block of one second cell, it is necessary to parse the system message of this second cell to determine the time for receiving the synchronization block, which may introduce a certain delay to the cell handover process, and may cause failure in cell handover for the user or degradation in the data transmission rate or even interruption, thereby affecting the user experience. According to the embodiment of the present disclosure, in the process of receiving the synchronization block of the second cell, it is not necessary to parse the system information of the second cell. By receiving the indication information in the system message of the first cell, it may be determined whether the first cell and the second cell are in the synchronous system. When they are in the synchronous system, the synchronization blocks of the N second cells can be received according to the time for receiving the synchronization block of the first cell, so that the time for receiving the synchronization block of the second cell can be determined more quickly. Therefore, the synchronization block can be received faster, and thus the synchronization information in the synchronization block can be acquired more quickly, so that the user equipment can quickly complete the handover of the cell.

In an embodiment, in the case that the first cell and the second cell belong to the synchronous system, the time when the first cell sends a synchronization block and the time when the second cell sends a synchronization block are synchronized to some extent.

For example, a cycle in which a 5G base station transmits a physical broadcast channel may be 80 milliseconds, and the cycle includes four cycles for transmitting synchronization blocks, that is, each cycle for transmitting a synchronization block is 20 milliseconds. The cycle for transmitting a synchronization block may contain a plurality of radio frames. For example, if one radio frame is 10 milliseconds, then one synchronization block may include 2 radio frames. Further, according to setting, transmission of the synchronization block has to be completed in the first 5 milliseconds or the last 5 milliseconds in one radio frame. That is, the time period for transmitting a synchronization block occupies a quarter of the cycle for transmitting the synchronization block.

Then, when the first cell and the N second cells belong to the synchronous system, the cycle for transmitting the synchronization block of the first cell is the same as the cycle for transmitting the synchronization block of each second cell, and the time when the first cell sends a synchronization block (that is, the time for receiving the synchronization block sent by the first cell) and the time when the second cell sends a synchronization block (that is, the time for receiving the synchronization block sent by the second cell) may in the same time period in one cycle, or may have a specific time difference, for example, the time difference may be 5 milliseconds, 10 milliseconds, or 15 milliseconds.

Therefore, when it is determined that the first cell and the N second cells belong to the synchronous system, since the user is currently in the first cell, it is possible to determine the time for receiving the synchronization block of the first cell. Then, when the time for receiving the synchronization block sent by the first cell and the time for receiving the synchronization block sent by the second cell are in the same time period in one cycle, the synchronization block of the second cell can be received at the time for receiving the synchronization block of the first cell. When there is a specific time difference between the time for receiving the synchronization block sent by the first cell and the time for receiving the synchronization block sent by the second cell, the synchronization block of the second cell can be received at a time delayed or advanced a specific time from the time for receiving the synchronization block of the first cell.

It can be seen that, in the process of receiving the synchronization block of the second cell in this embodiment, it is not necessary to parse the system information of the second cell, so that the time for receiving the synchronization block of the second cell can be determined more quickly, thereby receiving the synchronization block more quickly. In turn, the synchronization information (including the primary synchronization signal and/or the secondary synchronization signal) in the synchronization block can be acquired more quickly, so that the user equipment can quickly complete the handover of the cell.

Optionally, the indication information includes 1 bit.

In an embodiment, the indication information may only include 1 bit, and the 1 bit is used to indicate whether the first cell and the N second cells belong to the synchronous system. For example, if the bit is 0, it is determined that the first cell and the N second cells belong to the synchronous system; and if the bit is 1, it is determined that the first cell and the N second cells belong to the asynchronous system.

Figure 2:
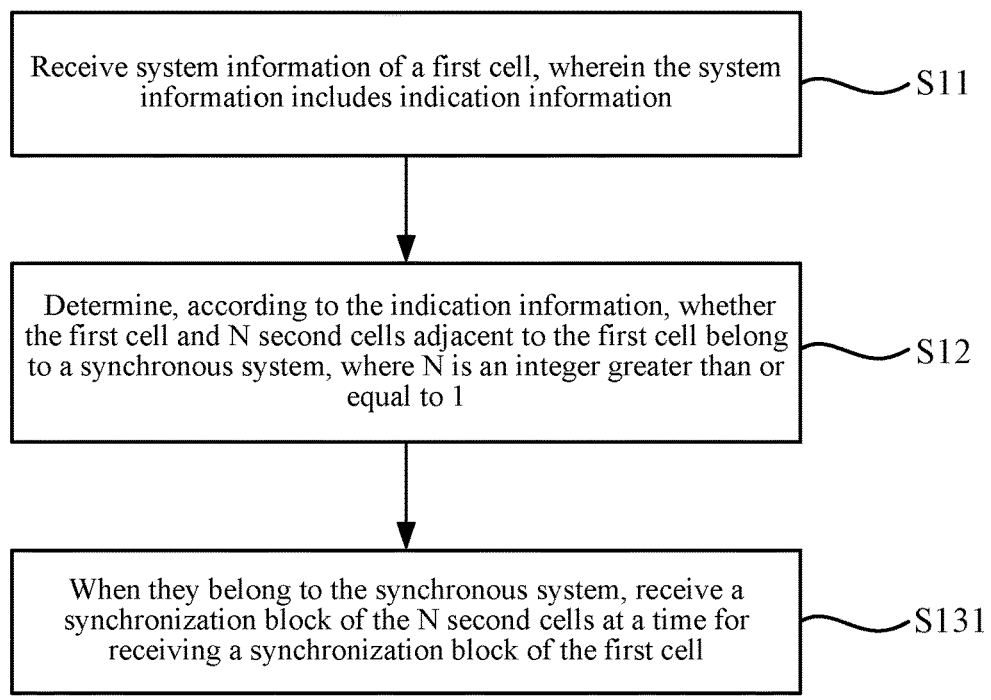
FIG. 2 is a schematic flowchart of another method for receiving a synchronization block according to an exemplary embodiment.

FIG. 2 is a schematic flowchart of another method for receiving a synchronization block according to an exemplary embodiment. As shown in FIG. 2, receiving the synchronization block of the N second cells according to the time for receiving the synchronization block of the first cell includes the following step.

In step S131, the synchronization block of the N second cells is received at the time for receiving the synchronization block of the first cell.

In an embodiment, if the indication information includes 1 bit, if the first cell and the second cell belong to the synchronous system, since the indication information does not indicate an offset of the time for receiving the synchronization block of the second cell with respect to the time for receiving the synchronization block of the first cell, it is considered by default that there is no time difference between the time for receiving the synchronization block of the first cell and the time for receiving the synchronization block of the second cell. Thus, the synchronization block of each of the second cells can be received at the time for receiving the synchronization block of the first cell.

Optionally, the indication information includes a plurality of bits, where 1 bit is used to indicate whether the first cell and the second cell belong to the synchronous system, and other bit is used to indicate an offset of the time for receiving the synchronization block of the N second cells with respect to the time for receiving the synchronization block of the first cell.

In an embodiment, the indication information may include a plurality of bits, where one of the plurality of bits may indicate whether the first cell and the N second cells belong to the synchronous system, and other bits of the plurality of bits may indicate an offset of the time for receiving the synchronization blocks of the N second cells with respect to the time for receiving the synchronization block of the first cell. For example, when the offset includes 5 milliseconds, 10 milliseconds, and 15 milliseconds, other bits may be 2 bits, and if the 2 bits are 01, the offset is 5 milliseconds; if the 2 bits are 10, the offset is 10 milliseconds; and if the 2 bits are 11, the offset is 15 milliseconds.

Figure 3:
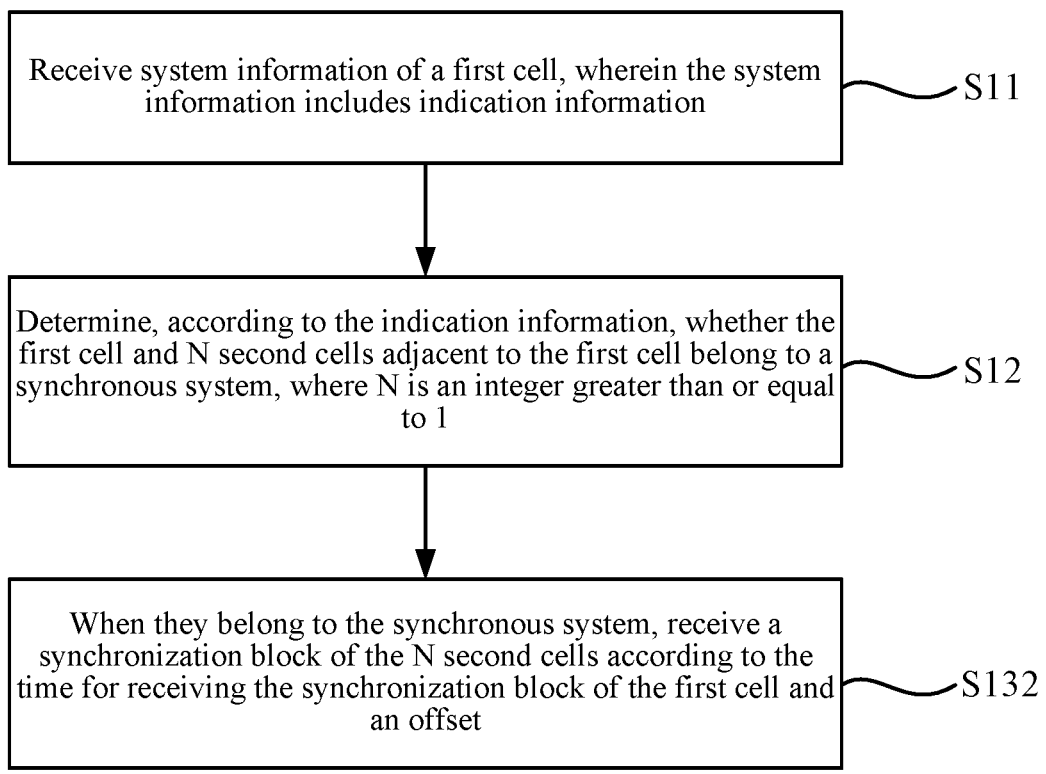
FIG. 3 is a schematic flowchart of still another method for receiving a synchronization block according to an exemplary embodiment.

FIG. 3 is a schematic flowchart of still another method for receiving a synchronization block according to an exemplary embodiment. As shown in FIG. 3, receiving the synchronization block of the N second cells according to the time for receiving the synchronization block of the first cell includes the following step.

In step S132, the synchronization block of the N second cells is received according to the time for receiving the synchronization block of the first cell and an offset.

In an embodiment, when the indication information includes a plurality of bits, since the indication information not only indicates whether the first cell and the N second cells belong to the synchronous system, but also indicates an offset of the time for receiving the synchronization block of the second cell with respect to the time for receiving the synchronization block of the first cell, in the case where the first cell and the N second cells belong to the synchronous system, the synchronization blocks of the second cells are received according to the time for receiving the synchronization block of the first cell and the offset.

For example, the time for receiving the synchronization block of the first cell is the first 5 milliseconds in the cycle of 20 milliseconds for transmitting the synchronization block, and the offset is 15 milliseconds, then the synchronization block of each of the second cells can be received at the fourth 5 milliseconds in the cycle of 20 milliseconds for transmitting the synchronization block.

Optionally, the plurality of bits are 3 bits.

In an embodiment, when the plurality of bits are 3 bits, 1 bit may be used to indicate whether the first cell and the second cell belong to the synchronous system, and the other 2 bits are used to indicate an offset of the time for receiving the synchronization block of the second cell with respect to the time for receiving the synchronization block of the first cell. In general, the cycle for transmitting the synchronization block is 20 milliseconds, and the synchronization block is in units of a half frame (for example, 5 milliseconds), so it will be transmitted in four time periods: 0 to 5 milliseconds, 5 milliseconds to 10 milliseconds, 10 milliseconds to 15 milliseconds and 15 milliseconds to 20 milliseconds in the 20 milliseconds. Therefore, there may only be 3 kinds of offsets: 5 milliseconds, 10 milliseconds and 20 milliseconds, which may be identified by 2 bits. Thus, the plurality of bits only may be provided as 3 bits, and no more bits is needed, so as to reduce the bits occupied by the indication information.

It should be noted that the case where the plurality of bits are 3 bits is applicable to the above case when the cycle for transmitting the synchronization block is 20 milliseconds, and when the cycle for transmitting the synchronization block is changed, or the length of the time period for which the synchronization block is in the cycle is changed, the number of bits included in the plurality of bits may be adjusted accordingly.

Figure 4:
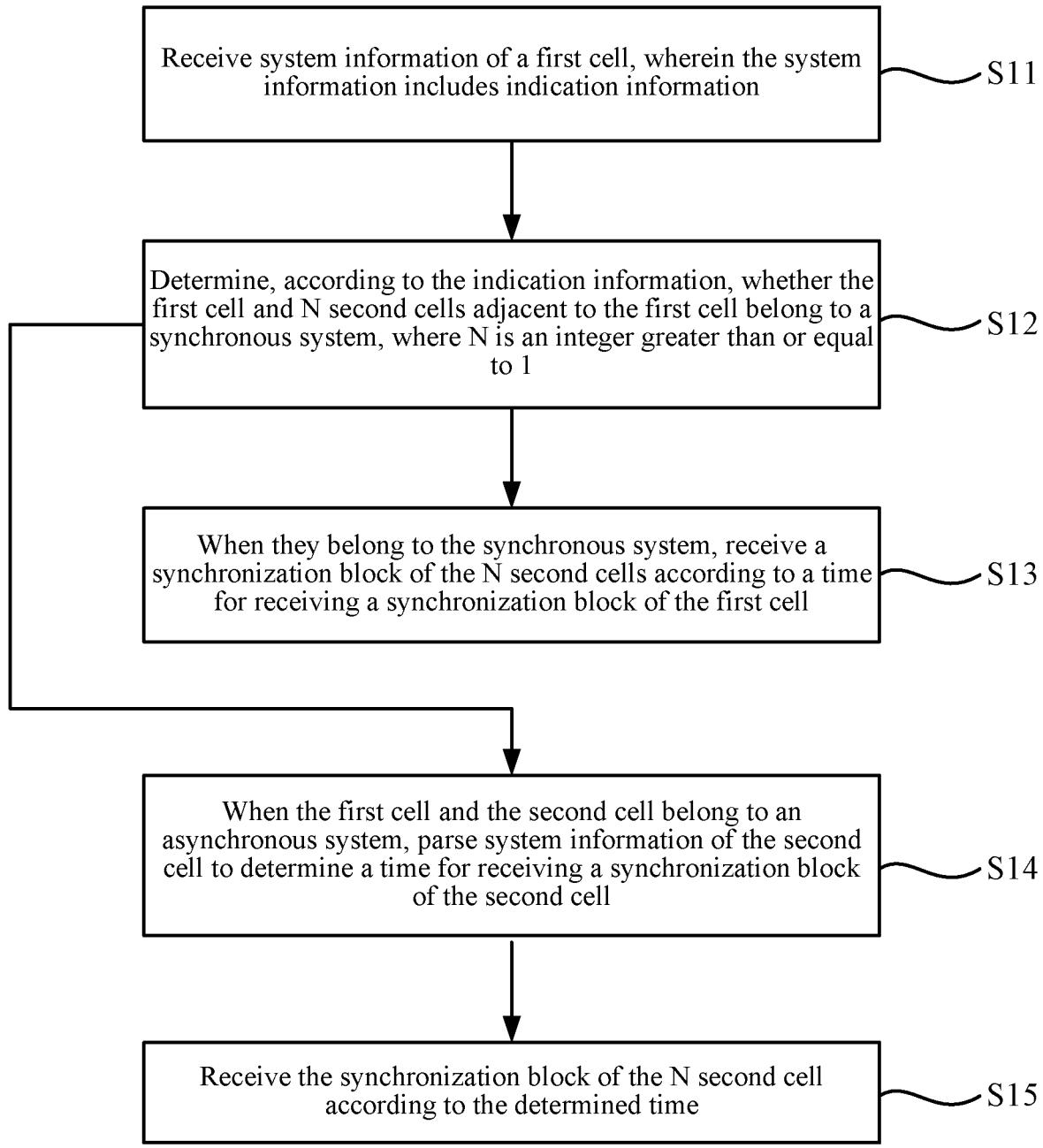
FIG. 4 is a schematic flowchart of still another method for receiving a synchronization block according to an exemplary embodiment.

FIG. 4 is a schematic flowchart of still another method for receiving a synchronization block according to an exemplary embodiment. As shown in FIG. 4, the above method further includes the following steps.

In step S14, if the first cell and the second cell belong to the asynchronous system, system information of the second cell is parsed to determine a time for receiving a synchronization block of the second cell.

In step S15, the synchronization block of the N second cells is received according to the determined time.

In an embodiment, in a case where the first cell and the second cell belong to the asynchronous system, then the time when the first cell sends the synchronization block and the time when the second cell sends the synchronization block are completely out of synchronization, so in order to determine the time for receiving the synchronization block of the second cell, it is still necessary to parse the system information of the second cell to determine the time for receiving the synchronization block of the second cell, and then the synchronization block of the second cell is received at that time.

Figure 5:
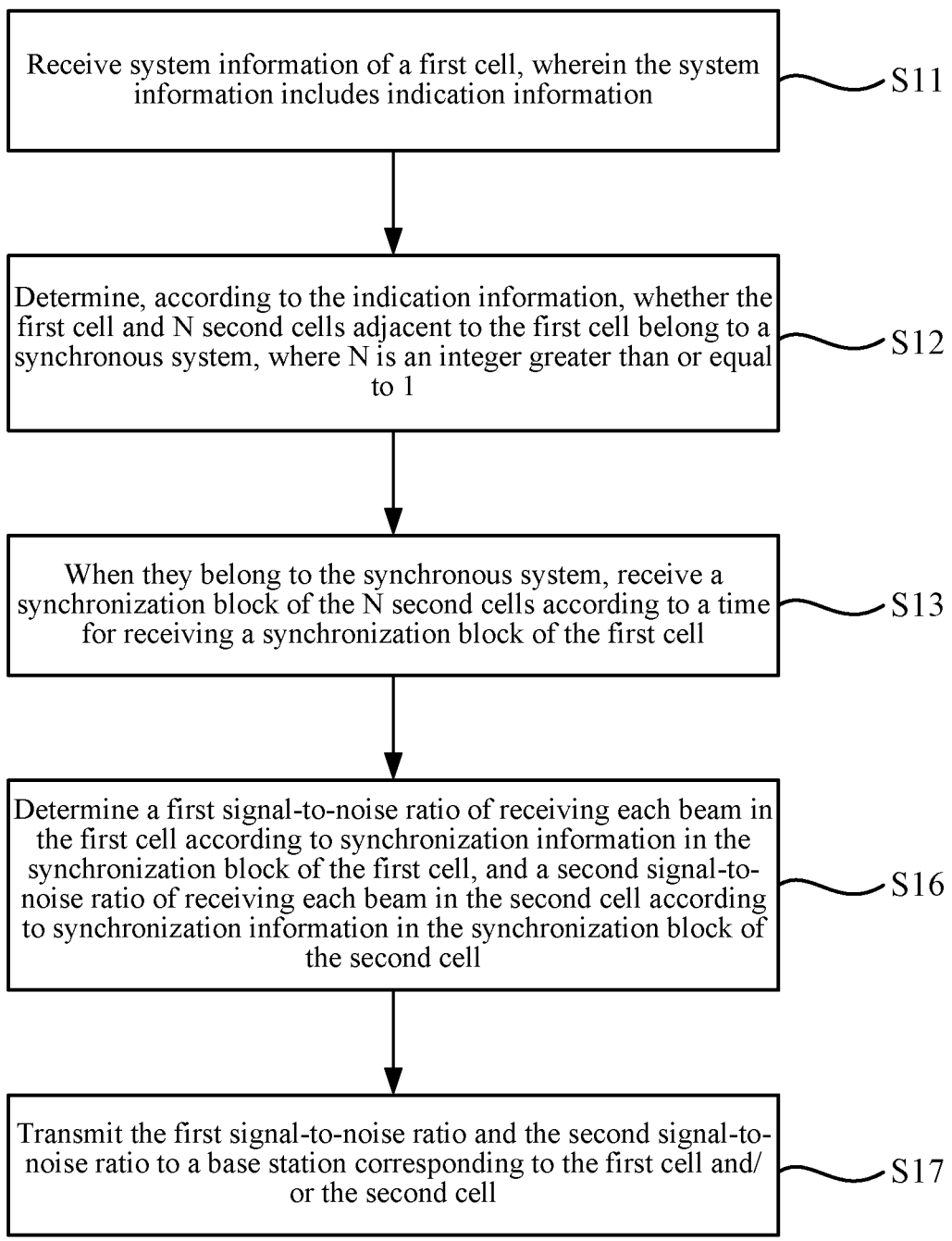
FIG. 5 is a schematic flowchart of still another method for receiving a synchronization block according to an exemplary embodiment.

FIG. 5 is a schematic flowchart of still another method for receiving a synchronization block according to an exemplary embodiment. As shown in FIG. 5, the method for receiving a synchronization block further includes the following steps.

In step S16, a first signal-to-noise ratio of receiving each beam in the first cell is determined according to synchronization information in the synchronization block of the first cell, and a second signal-to-noise ratio of receiving each beam in the second cell is determined according to synchronization information in the synchronization block of the second cell.

In step S17, the first signal-to-noise ratio and the second signal-to-noise ratio are transmitted to a base station corresponding to the first cell.

In an embodiment, the 5G signal is emitted in a beam scanning manner, correspondingly, the first cell and the second cell may include a plurality of beams, and the numbers of the beams may be the same or different. On the basis of the handover of the cell, it is also required to determine under which beam in the cell the user equipment is handed over to receive the signal. Therefore, it is necessary to determine the signal-to-noise ratio with respect to each beam in each of the N second cells, and then upload the signal-to-noise ratio of each beam, so that the base station (which may be the base station corresponding to the first cell or the base station corresponding to the second cell) can accurately determine which beam of which second cell of the N second cells has the highest signal-to-noise ratio for the user equipment.

Figure 6:
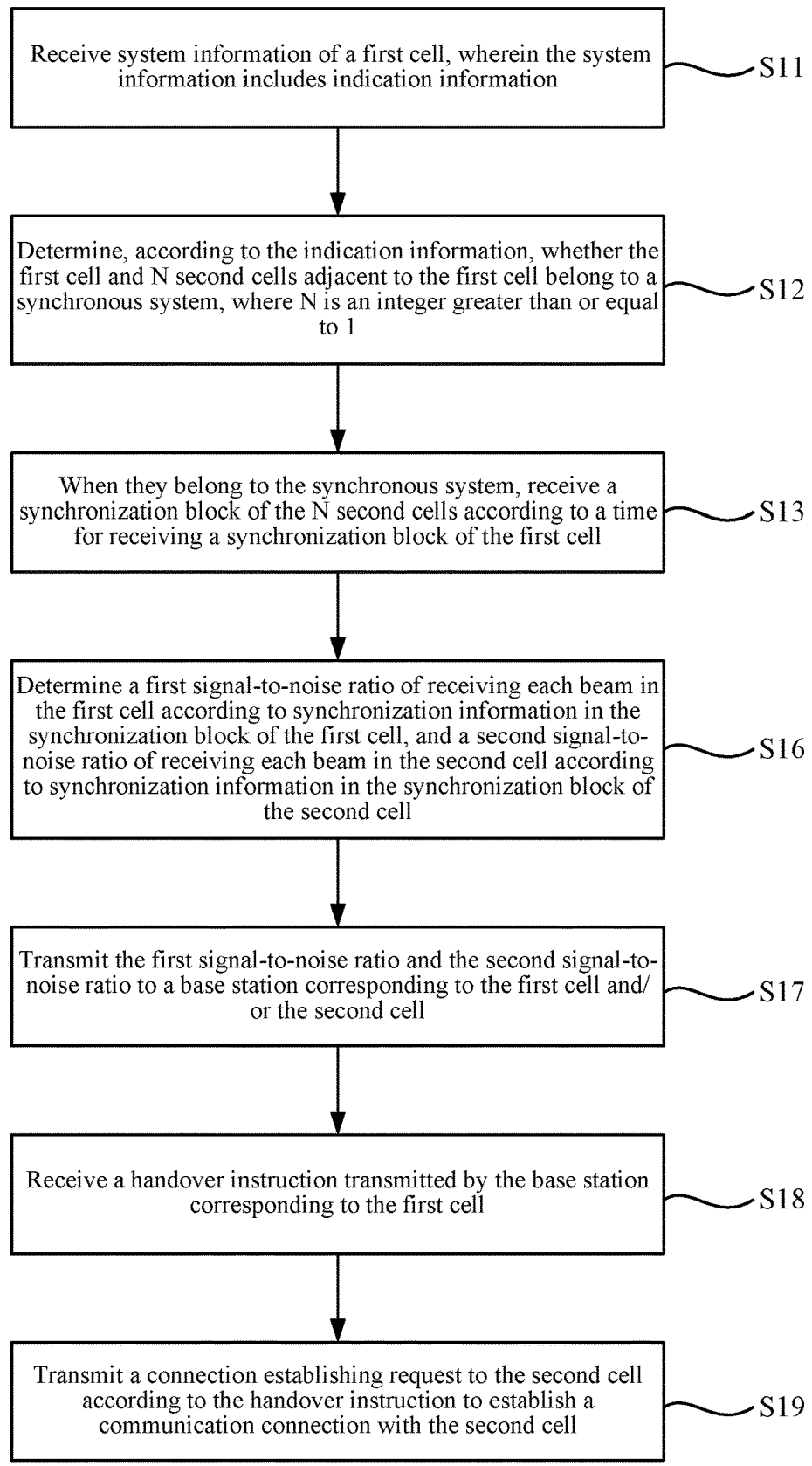
FIG. 6 is a schematic flowchart of still another method for receiving a synchronization block according to an exemplary embodiment.

FIG. 6 is a schematic flowchart of still another method for receiving a synchronization block according to an exemplary embodiment. As shown in FIG. 6, the method for receiving a synchronization block further includes the following steps.

In step S18, a handover instruction transmitted by the base station corresponding to the first cell is received.

In step S19, a connection establishing request is transmitted to the second cell according to the handover instruction to establish a communication connection with the second cell.

In an embodiment, the base station that receives the first signal-to-noise ratio and the second signal-to-noise ratio may transmit a handover instruction to the user equipment, if the base station determines that the user equipment needs cell handover according to the first signal-to-noise ratio and the second signal-to-noise ratio. The user equipment may receive the handover instruction to determine to which second cell of the N second cells the base station indicates the user equipment to be handed over. Then, the user equipment sends a connection establishing request to the second cell to establish a communication connection with the second cell.

FIG. 7 is a schematic flowchart of a method for transmitting system information according to an exemplary embodiment. The method in this embodiment may be applied to a 5G base station. As shown in FIG. 7, the method for transmitting system information includes the following step.

In step S61, the system information is transmitted to the user equipment, where the system information includes indication information, and the indication information is used to indicate whether the first cell where the user equipment is located and the second cell which sent the system information, belong to a synchronous system.

In an embodiment, corresponding to the embodiment shown in FIG. 1, the information transmitted by the base station to the user equipment may include indication information used to indicate whether the first cell where the user equipment is located and the second cell which sent the system information, belong to a synchronous system, so that if determining that the first cell and the second cell belong to the synchronous system, the user equipment may receive the synchronization block of the second cell according to the time for receiving the synchronization block of the first cell.

In this process, it is not necessary to parse the system information of the second cell, so it is possible to determine the time for receiving the synchronization block of the second cell more quickly, and receive the synchronization block more quickly. Therefore, the synchronization information in the synchronization block can be acquired more quickly, so that the user equipment can quickly complete the handover of the cell.

Optionally, the indication information includes 1 bit.

Optionally, the indication information includes a plurality of bits, where 1 bit is used to indicate whether the first cell and the second cell belong to the synchronous system, and other bit is used to indicate an offset of the synchronization block of the second cell with respect to the synchronization block of the first cell.

Optionally, the plurality of bits are 3 bits.

FIG. 8 is a schematic flowchart of another method for transmitting system information according to an exemplary embodiment. As shown in FIG. 8, the foregoing system information transmission method further includes the following steps.

In step S62, a first signal-to-noise ratio in receiving a signal of the first cell and a second signal-to-noise ratio in receiving a signal of the second cell, which are uploaded by the user equipment, are received.

In step S63, if the first signal-to-noise ratio is less than a first preset threshold, and the second signal-to-noise ratio is greater than a second preset threshold, a handover instruction is transmitted to the user equipment, so that the user equipment establishes a communication connection with the second cell.

In an embodiment, the synchronization information may include a primary synchronization signal and/or a secondary synchronization signal, and the user equipment may determine, according to the primary synchronization signal and/or the secondary synchronization signal, a signal-to-noise ratio in receiving signals of a cell that sent the synchronization information. After receiving the first signal-to-noise ratio and the second signal-to-noise ratio uploaded by the user equipment, the second cell may determine whether to enable the user equipment to perform cell handover according to the first signal-to-noise ratio and the second signal-to-noise ratio.

For example, in a case where the first signal-to-noise is relatively small (less than the first preset threshold), and the second signal-to-noise ratio is relatively large (greater than the second preset threshold), it may be determined that the user equipment cannot properly receive signals in the first cell, and can properly receive signals in the second cell. Thus, it is possible to make the user equipment to hand over to the second cell. Then, a handover instruction is transmitted to the user equipment, so that the user equipment establishes a communication connection with the second cell, thereby completing the cell handover.

Corresponding to the above embodiments of the method for receiving a synchronization block and the method for transmitting system information, the present disclosure also provides an embodiment of an apparatus for receiving a synchronization block and an apparatus for transmitting system information.

FIG. 9 is a schematic block diagram of an apparatus for receiving a synchronization block according to an exemplary embodiment. As shown in FIG. 9, the apparatus for receiving a synchronization block includes:

an information receiving module 91 configured to receive system information of a first cell, where the system information includes indication information;

a synchronization determining module 92 configured to determine, according to the indication information, whether the first cell and N second cells adjacent to the first cell belong to a synchronous system, where N is an integer greater than or equal to 1; and a synchronization block receiving module 93 configured to, if they belong to the synchronous system, receive a synchronization block of the N second cells according to a time for receiving a synchronization block of the first cell.

Optionally, the indication information includes 1 bit.

Optionally, the synchronization block receiving module is configured to receive the synchronization block of the N second cells at a time for receiving the synchronization block of the first cell.

Optionally, the indication information includes a plurality of bits, where 1 bit is used to indicate whether the first cell and the N second cells belong to the synchronous system, and other bit is used to indicate an offset of the time for receiving the synchronization block of the N second cells with respect to the time for receiving the synchronization block of the first cell.

Optionally, the synchronization block receiving module is configured to receive the synchronization block of the N second cells according to the time for receiving the synchronization block of the first cell and the offset.

Optionally, the plurality of bits are 3 bits.

Figure 10:
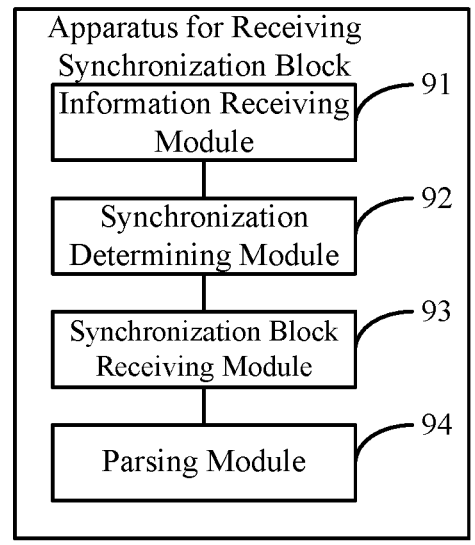
FIG. 10 is a schematic block diagram of another apparatus for receiving a synchronization block according to an exemplary embodiment.

FIG. 10 is a schematic block diagram of another apparatus for receiving a synchronization block according to an exemplary embodiment. As shown in FIG. 10, the above-mentioned synchronization block receiving apparatus further includes:

a parsing module 94 configured to, if the first cell and the second cell belong to an asynchronous system, parse system information of the second cell to determine a time for receiving a synchronization block of the second cell; and the synchronization block receiving module 93 is further configured to receive the synchronization block of the N second cells according to the determined time.

Figure 11:
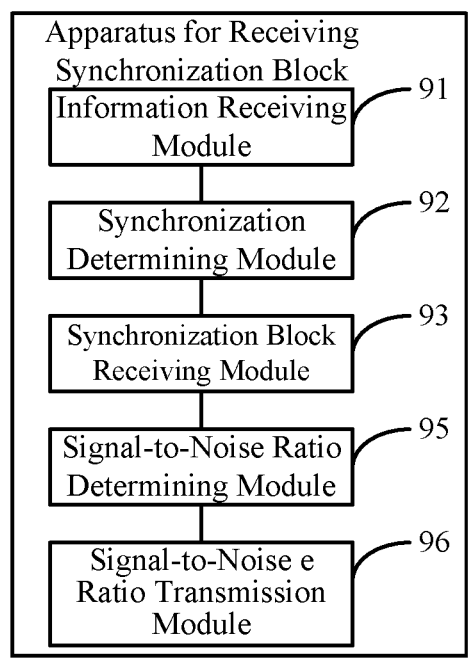
FIG. 11 is a schematic block diagram of still another apparatus for receiving a synchronization block according to an exemplary embodiment.

FIG. 11 is a schematic block diagram of still another apparatus for receiving a synchronization block according to an exemplary embodiment. As shown in FIG. 11, the above-mentioned synchronization block receiving apparatus further includes:

a signal-to-noise ratio determining module 95 configured to determine a first signal-to-noise ratio of each beam in receiving the first cell according to synchronization information in the synchronization block of the first cell, and a second signal-to-noise ratio of receiving each beam in the second cell according to synchronization information in the synchronization block of the second cell; and a signal-to-noise ratio transmission module 96 configured to transmit the first signal-to-noise ratio and the second signal-to-noise ratio to a base station corresponding to the first cell.

Figure 12:
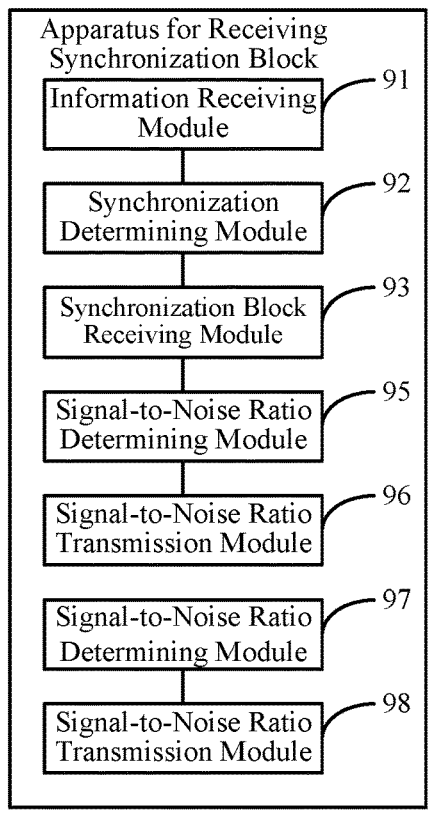
FIG. 12 is a schematic block diagram of still another apparatus for receiving a synchronization block according to an exemplary embodiment.

FIG. 12 is a schematic block diagram of still another apparatus for receiving a synchronization block according to an exemplary embodiment. As shown in FIG. 12, the above synchronization block receiving apparatus further includes:

an instruction receiving module 97 configured to receive a handover instruction transmitted by the base station corresponding to the first cell; and a connection establishing module 98 configured to transmit a connection establishing request to the second cell according to the handover instruction to establish a communication connection with the second cell.

Figure 13:
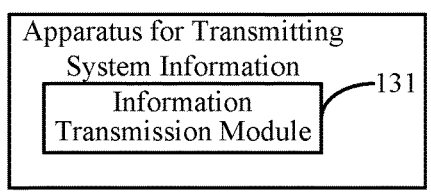
FIG. 13 is a schematic block diagram of an apparatus for transmitting system information according to an exemplary embodiment.

FIG. 13 is a schematic block diagram of an apparatus for transmitting system information according to an exemplary embodiment. As shown in FIG. 13, the apparatus for transmitting system information includes:

an information transmission module 131 configured to transmit system information to the user equipment, where the system information includes indication information, and the indication information is used to indicate whether the first cell where the user equipment is located and the second cell which sent the system information, belong to a synchronous system.

Optionally, the indication information includes 1 bit.

Optionally, the indication information includes a plurality of bits, where 1 bit is used to indicate whether the first cell and the second cell are in the synchronous system, and other bit is used to indicate an offset of the synchronization block of the second cell with respect to the synchronization block of the first cell.

Optionally, the plurality of bits is 3 bits.

Figure 14:
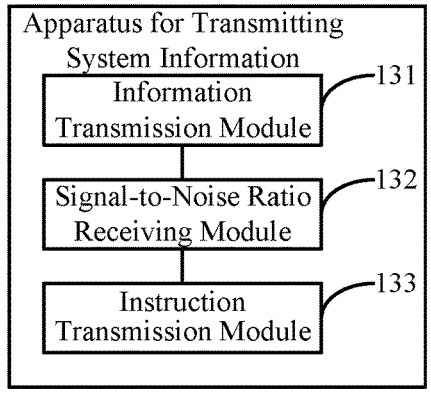
FIG. 14 is a schematic block diagram of another apparatus for transmitting system information according to an exemplary embodiment.

FIG. 14 is a schematic block diagram of another apparatus for transmitting system information according to an exemplary embodiment. As shown in FIG. 14, the apparatus for transmitting system information further includes:

a signal-to-noise ratio receiving module 132 configured to receive a first signal-to-noise ratio in receiving a signal of the first cell and a second signal-to-noise ratio in receiving a signal of the second cell, which are uploaded by the user equipment; and an instruction transmission module 133 configured to, if the first signal-to-noise ratio is less than a first preset threshold, and the second signal-to-noise ratio is greater than a second preset threshold, transmit a handover instruction to the user equipment, so that the user equipment establishes a communication connection with the second cell.

With regard to the apparatus in the above embodiments, the specific manner in which the respective modules perform the operations has been described in detail in the embodiments of the related methods, and will not be explained in detail herein.

For the apparatus embodiment, since it basically corresponds to the method embodiment, reference can be made to the description of the method embodiment. The apparatus embodiments described above are merely illustrative, where the modules described as separate components may or may not be physically separate, and the components displayed as modules may or may not be physical modules, i.e. may be located at one place, or may be distributed to multiple network modules. Some or all of the modules may be selected according to actual needs to achieve the objectives of the present disclosure. Those of ordinary skill in the art can understand and implement without any creative effort.

Correspondingly, the present disclosure further provides an apparatus for receiving a synchronization block, including: a processor; a memory for storing instructions executable by the processor; wherein the processor is configured to: receive system information of a first cell, where the system information includes indication information; determine, according to the indication information, whether the first cell and N second cells adjacent to the first cell belong to a synchronous system, where N is an integer greater than or equal to 1; and if they belong to the synchronous system, receive a synchronization block of the N second cells according to a time for receiving a synchronization block of the first cell.

Correspondingly, the present disclosure further provides an apparatus for transmitting system information, including: a processor; a memory for storing instructions executable by the processor; wherein the processor is configured to: transmit system information to the user equipment, where the system information includes indication information, and the indication information is used to indicate whether the first cell where the user equipment is located and the second cell which sent the system information, belong to a synchronous system.

Correspondingly, the present disclosure also provides a terminal. The terminal includes a memory, and one or more programs, wherein one or more programs are stored in the memory and configured to be processed by one or more processors. The one or more programs includes instructions to perform the following operations: receiving system information of a first cell, where the system information includes indication information; determining, according to the indication information, whether the first cell and N second cells adjacent to the first cell belong to a synchronous system, where N is an integer greater than or equal to 1; and if they belong to the synchronous system, receiving a synchronization block of the N second cells according to a time for receiving a synchronization block of the first cell.

Correspondingly, the present disclosure also provides a terminal. The terminal includes a memory, and one or more programs, wherein one or more programs are stored in the memory and configured to be processed by one or more processors. The one or more programs includes instructions to perform the following operations: transmitting system information to the user equipment, where the system information includes indication information, and the indication information is used to indicate whether the first cell where the user equipment is located and the second cell which sent the system information, belong to a synchronous system.

Figure 15:
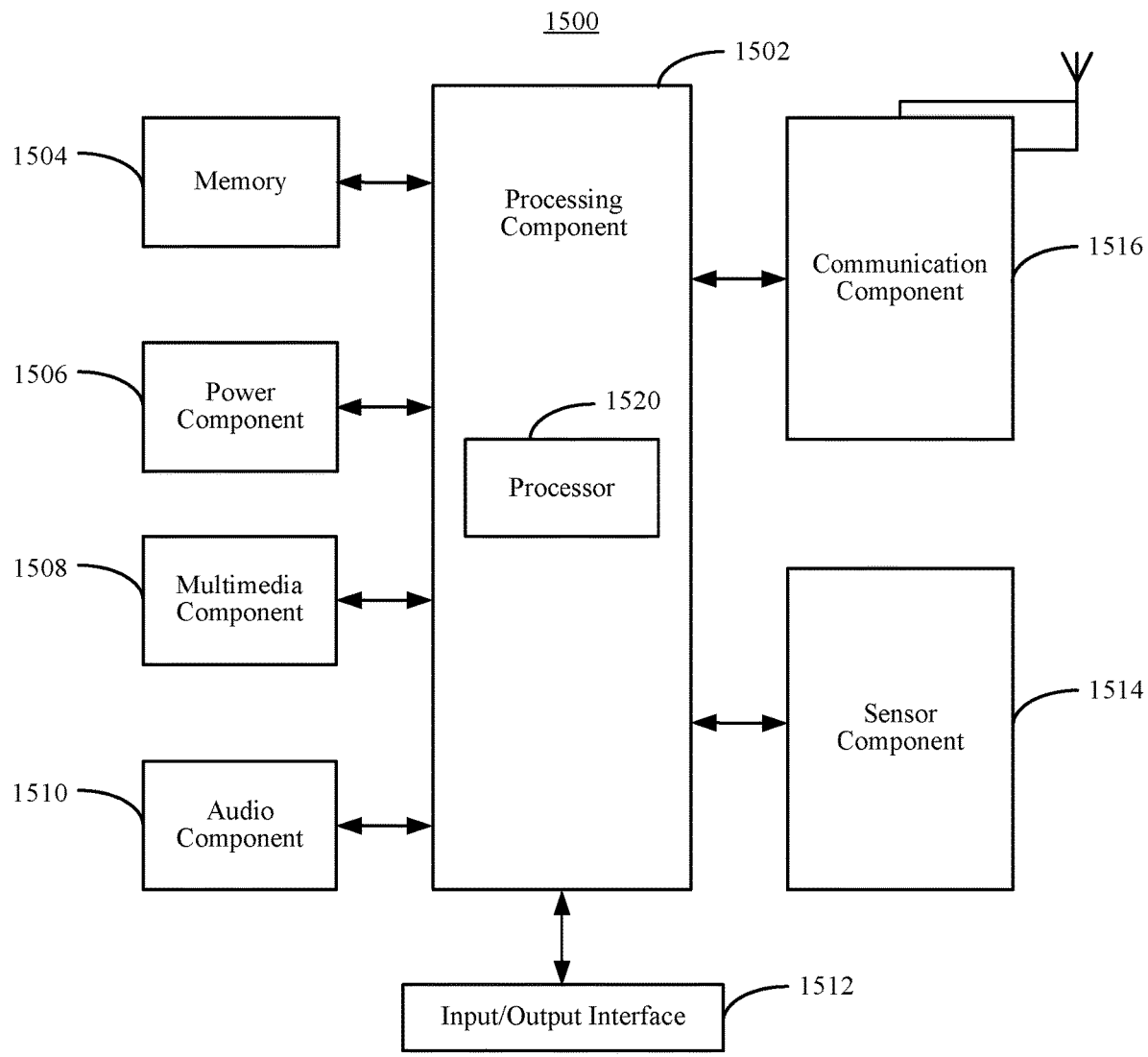
FIG. 15 is a schematic block diagram of an apparatus for receiving a synchronization block according to an exemplary embodiment.

FIG. 15 is a schematic block diagram of an apparatus 1500 for receiving a synchronization block according to an exemplary embodiment. For example, the apparatus 1500 may be a mobile phone, a computer, a digital broadcast terminal, a messaging device, a game console, a tablet device, a medical device, a fitness device, a personal digital assistant, and the like.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the apparatus 1500, such as the operations associated with display, phone call, data communications, camera operations, and recording operations. The processing component 1502 may include one or more processors 1520 to execute instructions, to perform all or part of the steps of the above method. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, telephone directory data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. When the apparatus 1500 is in an operation mode, such as a shooting mode or a video mode, the front camera and/or the rear camera can receive external multimedia data. Each front and rear camera can be a fixed optical lens system or have focal length and optical zoom capability.

The audio component 1510 is configured to output and/or input audio signals. For example, the audio component 1510 includes a microphone ("MIC") configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. These buttons may include, but are not limited to, a home button, a volume button, a start button, and a lock button.

The sensor component 1514 includes one or more sensors to provide status assessments of various aspects of the apparatus 1500. For instance, the sensor component 1514 may detect an on/off status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the apparatus 1500 and other devices. The apparatus 1500 can access a wireless network based on a communication standard, such as WiFi, 2G, or 3G, or a combination thereof. In one exemplary embodiment, the communication component 1516 receives a broadcast signal or broadcast associated information from an external broadcast management system via a broadcast channel In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the method for receiving a synchronization block in the embodiments as shown in FIG. 1 to FIG. 6.

In exemplary embodiments, there is also provided a non-transitory computer-readable storage medium including instructions, such as included in the memory 1504, executable by the processor 1320 in the apparatus 1500 to perform the above method. For example, the non-transitory computer-readable storage medium may be a ROM, a random access memory (RAM), a CD-ROM, a magnetic tape, a floppy disc, an optical data storage device, and the like.

Figure 16:
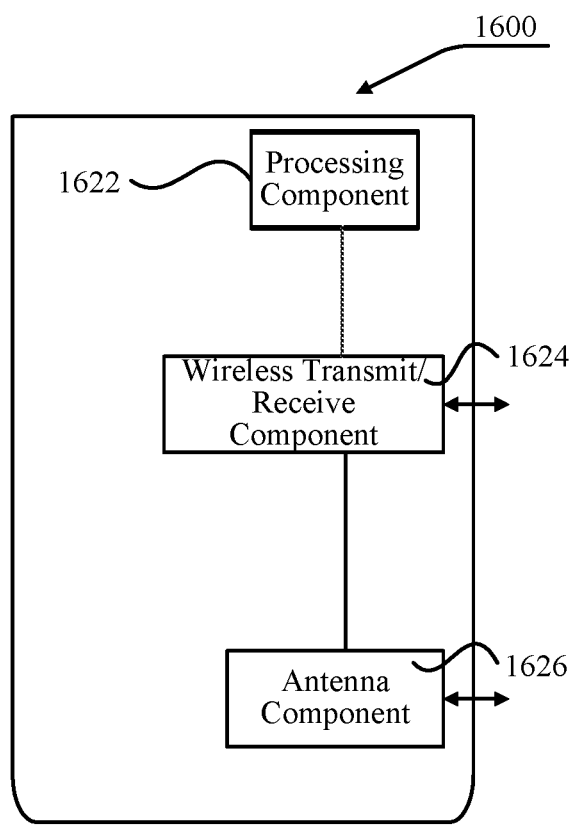
FIG. 16 is a schematic block diagram of an apparatus for transmitting system information according to an exemplary embodiment.

FIG. 16 is a schematic block diagram of an apparatus 1600 for transmitting system information according to an exemplary embodiment. The apparatus 1600 can be provided as a base station. Referring to FIG. 16, the apparatus 1600 includes a processing component 1622, a wireless transmit/receive component 1624, an antenna component 1626, and a signal processing portion specific to the wireless interface. The processing component 1622 can further include one or more processors. One processor of the processing components 1622 can be configured to perform the method for transmitting system information of the embodiment shown in FIG. 7 or FIG. 8.

It should be noted that, in this context, relational terms such as first and second are used merely to distinguish one entity or operation from another entity or operation, and do not necessarily require or imply that there is any such actual relationship or order between these entities or operations. The terms "including", "comprising" or any other variants are intended to include a non-exclusive inclusion, such that a process, method, article, or device that includes a plurality of elements includes not only those elements but also other elements not specifically listed, or elements that are inherent to such a process, method, article, or device. An element that is defined by the phrase "comprising a . . . " does not exclude the presence of additional equivalent elements in the process, method, article, or device that comprises the element.

The method and apparatus provided by the embodiments of the present disclosure have been described in detail above. The principles and implementations of the present disclosure have been described with reference to specific examples. The description of the above embodiments is only for helping to understand the method and its core idea of the present disclosure. Moreover, those skilled in the art, according to the idea of the present disclosure, may make changes in the specific embodiments and application scope. Accordingly, the contents of this specification should not be construed as limitations on the present disclosure.

What is claimed is:

1. A method for receiving a synchronization block, comprising:
receiving system information of a first cell, wherein the system information comprises indication information;
determining, according to the indication information, whether the first cell and a second cell adjacent to the first cell belong to a synchronous system; and
when the first cell and the second cell belong to the synchronous system, receiving a synchronization block of the second cell according to a time for receiving a synchronization block of the first cell,
wherein when the indication information comprises a first bit indicating whether the first cell and the second cell belong to the synchronous system, and one or more second bits indicating an offset of a time for receiving the synchronization block of the second cell with respect to the time for receiving the synchronization block of the first cell, the receiving the synchronization block of the second cell according to the time for receiving the synchronization block of the first cell comprises: receiving the synchronization block of the second cell according to the time for receiving the synchronization block of the first cell and the offset, wherein a number of the second bits depends on a number of available offsets of the time for receiving the synchronization block of the second cell with respect to the time for receiving the synchronization block of the first cell, and the number of the available offsets depends on a cycle for transmitting the synchronization block.

2. The method according to claim 1, wherein when the indication information comprises 1 bit, the receiving the synchronization block of the second cell according to the time for receiving the synchronization block of the first cell comprises: receiving the synchronization block of the second cell at the time for receiving the synchronization block of the first cell.

3. The method according to claim 1, further comprising:
when the first cell and the second cell belong to an asynchronous system, parsing system information of the second cell to determine the time for receiving the synchronization block of the second cell; and
receiving the synchronization block of the second cell according to the determined time.

4. The method according to claim 1, further comprising:
determining a first signal-to-noise ratio of receiving each beam in the first cell according to synchronization information in the synchronization block of the first cell, and a second signal-to-noise ratio of receiving each beam in the second cell according to synchronization information in the synchronization block of the second cell; and
transmitting the first signal-to-noise ratio and the second signal-to-noise ratio to a base station corresponding to the first cell.

5. The method according to claim 4, further comprising:
receiving a handover instruction transmitted by the base station corresponding to the first cell; and
transmitting a connection establishing request to the second cell according to the handover instruction to establish a communication connection with the second cell.

6. An electronic device, comprising:
a processor; and
a memory for storing instructions executable by the processor;
wherein the processor is configured to:
receive system information of a first cell, wherein the system information comprises indication information;
determine, according to the indication information, whether the first cell and a second cell adjacent to the first cell belong to a synchronous system; and
when the first cell and the second cell belong to the synchronous system, receive a synchronization block of the second cell according to a time for receiving a synchronization block of the first cell,
wherein when the indication information comprises a first bit indicating whether the first cell and the second cell belong to the synchronous system, and one or more second bits indicating an offset of a time for receiving the synchronization block of the second cell with respect to the time for receiving the synchronization block of the first cell, the processor is configured to:
receive the synchronization block of the second cell according to the time for receiving the synchronization block of the first cell and the offset, wherein a number of the second bits depends on a number of available offsets of the time for receiving the synchronization block of the second cell with respect to the time for receiving the synchronization block of the first cell, and the number of the available offsets depends on a cycle for transmitting the synchronization block.

7. The electronic device of claim 6, wherein when the indication information comprises 1 bit, the processor is further configured to receive the synchronization block of the second cell at the time for receiving the synchronization block of the first cell.

8. The electronic device of claim 6, wherein the processor is further configured to:
when the first cell and the second cell belong to an asynchronous system, parse system information of the second cell to determine the time for receiving the synchronization block of the second cell; and
receive the synchronization block of the second cell according to the determined time.

9. The electronic device of claim 6, wherein the processor is further configured to:
determine a first signal-to-noise ratio of receiving each beam in the first cell according to synchronization information in the synchronization block of the first cell, and a second signal-to-noise ratio of receiving each beam in the second cell according to synchronization information in the synchronization block of the second cell; and
transmit the first signal-to-noise ratio and the second signal-to-noise ratio to a base station corresponding to the first cell.

10. The electronic device of claim 9, wherein the processor is further configured to:
receive a handover instruction transmitted by the base station corresponding to the first cell; and
transmit a connection establishing request to the second cell according to the handover instruction to establish a communication connection with the second cell.

11. An electronic device, comprising:
a processor; and
a memory for storing instructions executable by the processor;
wherein the processor is configured to:
transmit system information to user equipment, wherein the system information comprises indication information, and the indication information indicates whether a first cell where the user equipment is located and a second cell which sent the system information belong to a synchronous system,
wherein the indication information comprises a first bit indicating whether the first cell and the second cell belong to the synchronous system, and one or more second bits indicating an offset of a time for receiving the synchronization block of the second cell with respect to the time for receiving the synchronization block of the first cell, wherein a number of the second bits depends on a number of available offsets of the time for receiving the synchronization block of the second cell with respect to the time for receiving the synchronization block of the first cell, and the number of the available offsets depends on a cycle for transmitting the synchronization block.

12. The electronic device according to claim 11, wherein the processor is further configured to:
receive, from the user equipment, a first signal-to-noise ratio in receiving a signal of the first cell and a second signal-to-noise ratio in receiving a signal of the second cell; and
when the first signal-to-noise ratio is less than a first preset threshold, and the second signal-to-noise ratio is greater than a second preset threshold, transmit a handover instruction to the user equipment, so that the user equipment establishes a communication connection with the second cell.

* * * * *